United States Patent [19]

Biebuyck

[11] 3,916,595

[45] Nov. 4, 1975

[54] METHOD FOR GLASS FRAMING

[75] Inventor: Lawrence F. Biebuyck, Mesquite, Tex.

[73] Assignee: Kawneer Company, Inc., Niles, Mich.

[22] Filed: Dec. 13, 1974

[21] Appl. No.: 532,514

Related U.S. Application Data

[60] Division of Ser. No. 499,216, Aug. 21, 1974, which is a continuation of Ser. No. 401,592, Sept. 28, 1973, abandoned, which is a continuation of Ser. No. 197,705, Nov. 11, 1971, abandoned, which is a continuation-in-part of Ser. No. 59,915, July 3, 1970, abandoned.

[52] U.S. Cl. .................................. 52/747; 52/476
[51] Int. Cl.² ..................... E04C 2/38; E04C 3/32
[58] Field of Search ............ 52/747, 745, 741, 476, 52/475, 397, 127, 738, 720, 730, 731

[56] References Cited
UNITED STATES PATENTS

| 3,023,859 | 3/1962 | Muessel | 52/720 |
| 3,147,518 | 9/1964 | Horgan | 52/476 |
| 3,234,697 | 2/1966 | Toti et al. | 52/588 X |
| 3,403,491 | 10/1968 | Eichman | 52/476 X |
| 3,452,501 | 7/1969 | Zimmer et al. | 52/625 |
| 3,566,561 | 3/1971 | Tozer | 52/720 X |
| 3,596,425 | 8/1971 | Kodaras | 52/476 X |

Primary Examiner—Price C. Faw, Jr.
Attorney, Agent, or Firm—Mason, Kolehmainen, Rathburn & Wyss

[57] ABSTRACT

There is provided an improved glass framing system including spaced vertical mullions having exceptionally narrow face width. The narrow face effect is acheived by providing opposed shallow glazing pockets; however, contiguous with one of the shallow pockets is a deep glazing area so that the glass or other panel may be first inserted into the deep glazing area of one mullion, and then shifted from the deep glazing area to the normal shallow glazing area contiguous therewith to provide retention of the panel in confronting shallow glazing pockets.

3 Claims, 14 Drawing Figures

METHOD FOR GLASS FRAMING

This is a divisional application of copending patent application Ser. No. 499,216, filed on Aug. 21, 1974. Patent application Ser. No. 499,216 is a continuation application of patent application Ser. No. 401,592, filed on Sept. 28, 1973 and now abandoned. Patent application Ser. No. 401,592 is a continuation application of application Ser. No. 197,705, filed on Nov. 11, 1971 and now abandoned. Patent application Ser. No. 197,705 is a continuation-in-part application of patent application Ser. No. 59,915, filed on July 31, 1970 and now abandoned.

The present invention relates to an improved glass framing system, and more particularly to a glass framing system the members of which have a very narrow face width.

Heretofore difficulty has been experienced in obtaining glas framing, such as spaced apart mullions, having a minimum face width, particularly with the adjacent glass or other panels being held in the same plane. Typically a glass framing wall system with the panels inserted after erection of the framing, or upon reglazing, requires a mullion structure having a deep glazing pocket and a shallow glazing pocket in adjacent mullions confronting each other. It is understood that the term "shallow glazing pocket" as herein used, refers to a glazing pocket normally accepting the edge of a glazing panel substantially for the depth of the pocket, while a "deep glazing pocket" refers to a glazing pocket wherein the edge of the panel is spaced outward from the bottom of the pocket so that the edge of a glazed panel will normally extend only partially toward the bottom of a deep glazing channel. Conventionally the edge of the glass or other panel may first be inserted into the deep glazing pocket, the opposite edge then being inserted into the confronting shallow glazing pocket, and thereafter the glass or other panel being shifted toward the shallow channel to position the glass or other panel. Typically the glass stops are then assembled to retain the glass in position. It will be understood that in the typical system just described each mullion has opposed deep and shallow glazing pockets. Thus the face or width of the mullion is necessarily dependent on the combined depth of a deep and shallow glazing channel. Moreover in such an arrangement there is always a danger present that the glass will creep back toward the bottom of the deep glazing channel in the absence of blocking and the like.

Accordingly, it is an object of the present invention to provide a new and improved glass framing system which overcomes the above mentioned difficulties.

Yet another object of the present invention is the provision of a new and improved glass framing system having a provision of a new and improved glass framing system having frame members of very narrow face width.

Another object of the present invention is the provision of a new and improved mullion construction having a very narrow face width.

Still another object of the present invention is the provision of a new and improved glazing system.

Yet another object of the present invention is the provision of a framing system having coplanar adjacent panels supported by a narrow face framing system.

Yet another object of the present invention is the provision of a new and improved mullion filler assembly.

Further objects and advantages of the present invention will become apparent as the following description proceeds and the features of novelty which characterize the invention will be pointed out with particularity in the claims annexed to and forming a part of the specification.

In accordance with these and other objects there is provided an improved glass framing system having a narrow face mullion structure. Each of the mullions is formed with opposed shallow glazing areas, and a deep glazing area is contiguous with one of the shallow glazing areas. Accordingly glazing may be installed by insertion of an edge thereof into the deep glazing areas, positioning of the opposite edge of the glass panel into the adjacent confronting shallow glazing area, and thereafter shifting of the first edge of the glass panel from the deep glazing area to the contiguous shallow glazing area of the mullion. Mullion fillers may then be applied to prevent the glass from shifting back into the deep glazing area and to cover the deep glazing area.

Suitable hardware and joinery are provided for completing the wall system, and include a novel snap-together threshold assembly, the mullion filler system and nylon setting blocks for relieving the horizontals of any load from the weight of glass.

Advantageously since the glass has been installed it is impossible for the glass to shift into the deep pocket and thereby expose the raw edge of glass at the opposite side. Moreover there is provided a system having a very desirable architectural appearance with minimum face width of the frame members. In addition to the narrow profile, the frame members are capable of accepting glass in the conventional flush glaze manner, without the application of projected stops, and without offsetting of the planes of adjacent glass panels. The mullion system is compatible with other mullion systems and may be used in connection thereto.

For a better understanding of the present invention, reference may be had to the accompanying drawings wherein.

Figure 1:
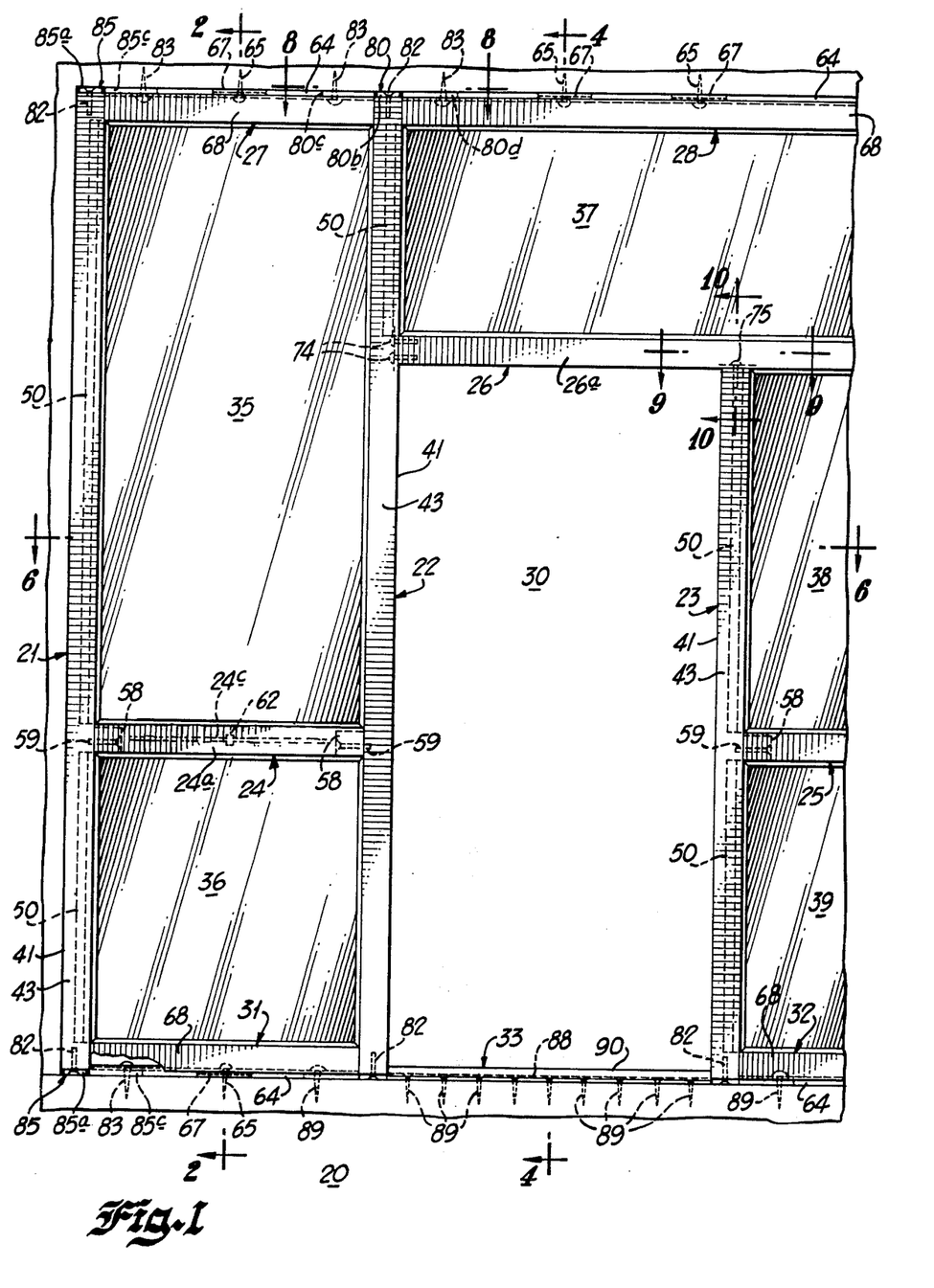
FIG. 1 is an elevational view of a glass framing assembly, including an entrance, according to the present invention.

Referring now to the drawings, and particularly to the embodiments of FIGS. 1 through 12, there is illustrated a glass framing assembly generally referred to as 20, FIG. 1, in accordance with the present invention. As therein illustrated the glass framing assembly 20 includes spaced vertical mullions 21 and 22, a cripple mullion 23, intermediate horizontals 24 and 25, and a transom member 26. Intermediate the two vertical mullions, such as mullions 21 and 22, are header members 27 and 28. The mullions 22 and 23 and transom member 26 define an entrance opening 30 for a door (not shown). Along the bottom of the glass framing assembly 20 are sill members 31 and 32 extending between the vertical mullions, except in the area of the entrance opening 30 wherein there is provided a threshold assembly 33. The interconnecting mullions and frame member define glazing openings for supporting suitable glazing panels, such as glazing panels 35, 36, 37, 38 and 39, of glass or other suitable material.

Figure 6:
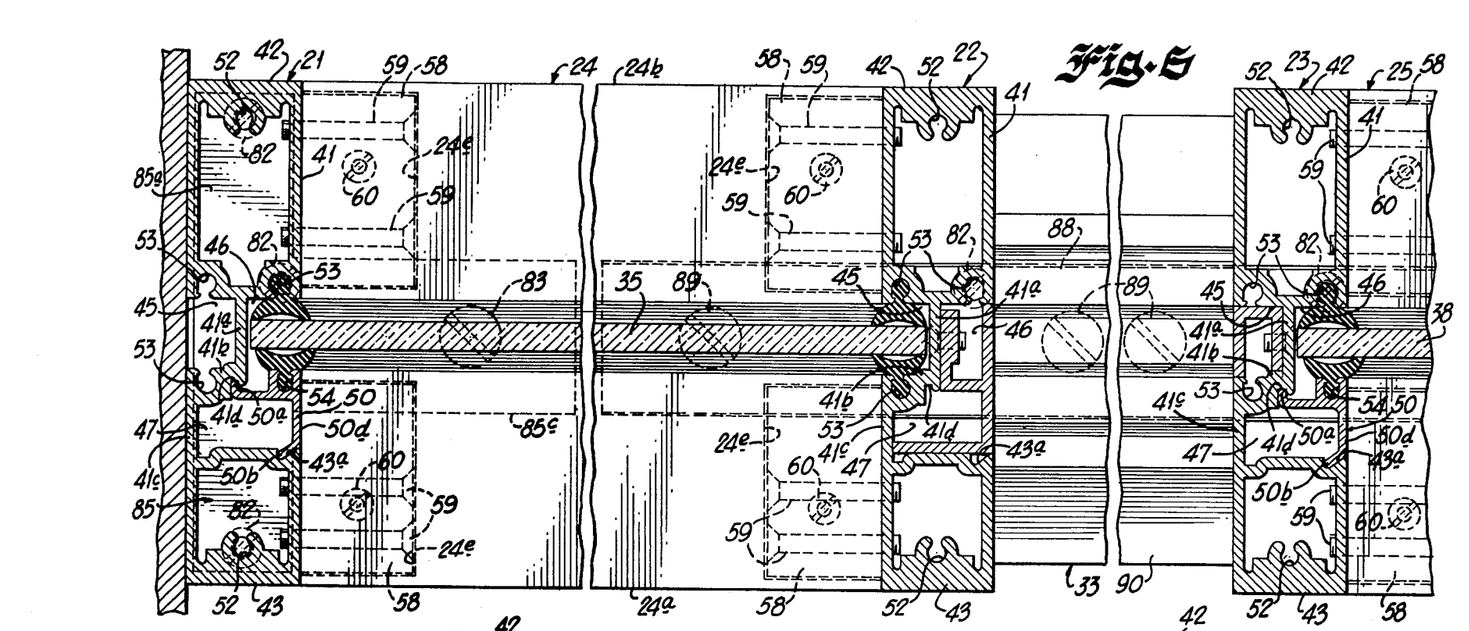
FIG. 6 is a plan sectional view of the glass framing assembly of FIG. 1, taken along line 6—6 of FIG. 1.

The basic vertical members or mullions, such as the mullions 21, 22 and 23, are best illustrated in cross section in FIG. 6. Referring to the vertical mullion 21 as typical, the vertical mullion 21 includes a unitary extruded construction element, of aluminum or other suitable extrudable material, 41 having inner and outer face portions 42 and 43 defining spaced apart parts and interconnecting portions. Each of the inner and outer face portions, in the illustrated embodiment, are of generally tubular cross section of particularly narrow width. In a particular commercial embodiment, the width of the face portions 42 and 43 is 1 inch. The face portions 42 and 43 are connected by suitable web portions including a longitudinally extending transverse web portion 41a having one edge thereof integrally secured to the face portion 42 intermediate its width and forming the bottom of opposed shallow glazing pockets 45 and 46. A longitudinally extending web 41b extends normal to the transverse web 41a therefrom to the side surface of the face portion 43, and a further transversely extending web 41c interconnects the web 41b with the face portion 43. The webs 41b and 41c, with the face portion 43, together define or form a stepped glazing pocket including as integral portions thereof a deep glazing pocket or area 47 contiguous with the shallow glazing pocket 46, and having a depth substantially greater than the depth of the shallow glazing pocket 46.

Figure 7:
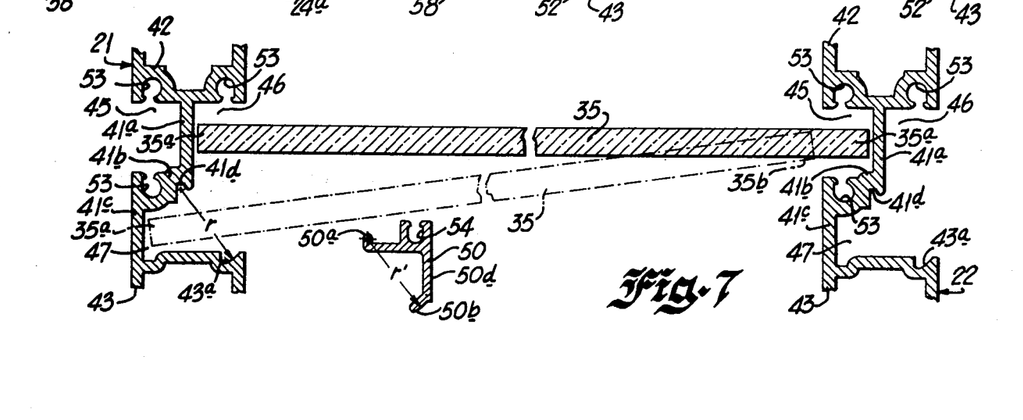
FIG. 7 is a fragmentary plan view of the glass framing assembly of FIG. 1, illustrating the glazing technique.

To retain glazing in place in the contiguous glazing pockets 46 and 47, there is provided a suitable mullion filler 50, best illustrated in FIG. 7. In the illustrated embodiment the mullion filler 50 is of the roll-in type, and to this end there is provided a longitudinally extending groove 41d within the contiguous pockets 46 and 47 for receiving a toe portion 50a of the mullion filler 50, which together define a hinge. Moreover the inner surface of the face portion 43 is provided with a longitudinally extending recess extending inwardly from the outer or jamb surface thereof and having a surface 43a approximating an arc extending from the center of the groove 41d, with a radius r. The mullion filler 50 includes an outer external surface 50b complementary to the recess 43a, so that the toe portion 50a of the mullion filler 50 may be inserted in the groove 41d, and the mullion filler 50 may then be rolled into mating position with the surface of the recess 43a. The surface 50b is formed with a curvature approximately an arc having a radius r' equal to the radius r providing the rolling fit.

To provide for a latitude of installation options, the construction elements 41 are formed with a plurality of screw aplines 52, and, in the outer edges of the shallow pockets 45 and 46, the construction elements 41 have integrally formed splines 53 shaped as combination screw splines for receiving a threaded fastener, and as gasket retaining grooves for retaining glazing gaskets. Confronting the spline 53 in the shallow glazing pocket 46 on the mullion filler 50 is provided a gasket retaining channel 54, FIGS. 6 and 7.

The manner of glazing for the wall system 20 is illustrated in FIG. 7. As therein illustrated the glass panel 35 has a first edge 35a positioned with the deep glazing pocket 47 of the vertical mullion 21. The other end 35b thereof will then clear the face portions of the adjacent mullion 22, so that the panel 35 may be directed into the shallow glazing channel 45 of the mullion 22. Thereafter the panel 35 may be shifted laterally from the position illustrated in phantom to the position illustrated in solid in FIG. 7. The mullion filler 50 may then be rolled into position, the retaining gaskets installed, and glazing is now complete.

In a commercial installation the shallow glazing pockets 46 and 47 are nominally seven-sixteenths inch deep, while the auxiliary or deep glazing pocket 47 contiguous with the glazing pocket 46 is nominally seven-eighths of an inch deep. Thus with the glazing installed the glass coverage in the glazing pockets is normally a standard three-eighths inch. Moreover once the glazing has been installed, it is impossible for the glass to shift back to the deep pocket preventing exposure of any raw edges of the glass on opposite sides. The mullions 21, 22, and 23 are nominally 1 inch wide, and the single web 41a interconnecting the faces 42 and 43 attributes to the narrow or shallow depth of the mullion.

Figures 2, 3:
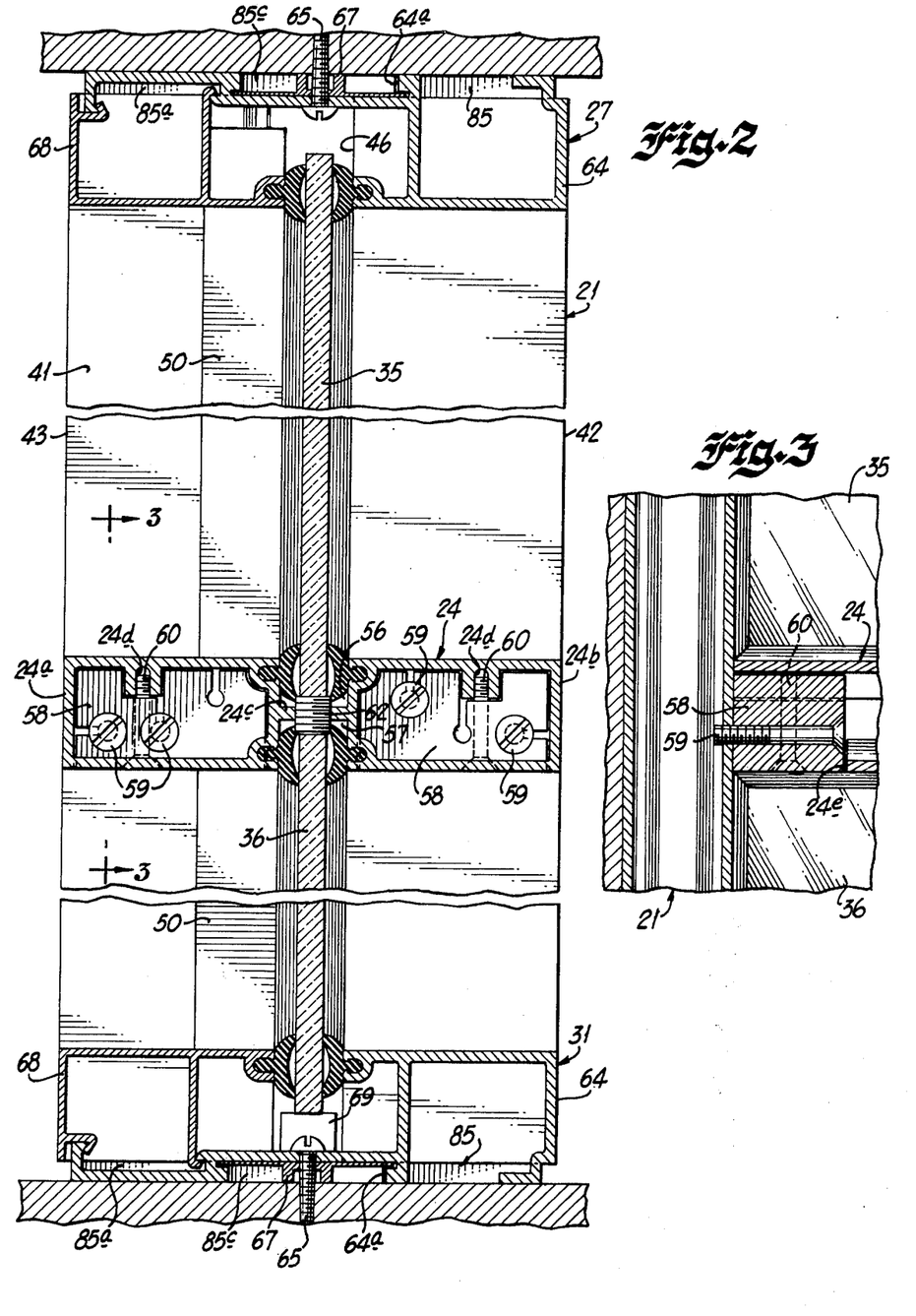
FIG. 2 is an elevational sectional view of the glass framing assembly of FIG. 1, taken along line 2—2 of FIG. 1.
FIG. 3 is a detail cross sectional view of the glass framing assembly of FIG. 1, taken along line 3—3 of FIG. 2.
Figures 11, 12:
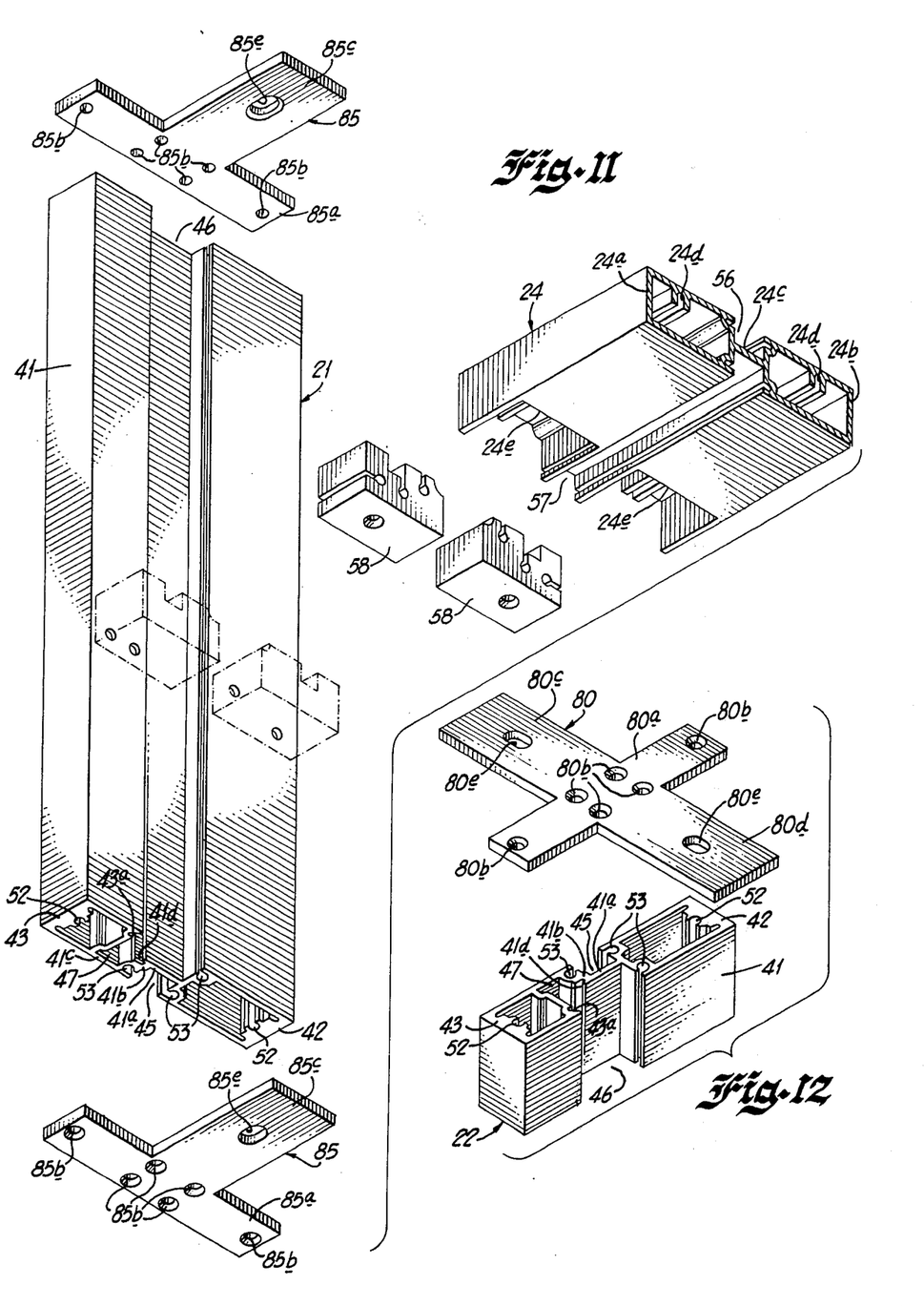
FIG. 11 is a fragmentary perspective exploded view of the glass framing assembly of FIG. 1.
FIG. 12 is a fragmentary perspective view of a detail of glass framing assembly of FIG. 1.

To provide for intermediate horizontals, a horizontal mullion having a face width of one inch is provided for matching the width of the vertical mullion. The 1-inch face horizontal is best illustrated in FIGS. 2 and 11. As therein illustrated there is provided the intermediate horizontal 24 having tubular face portions 24a, 24b interconnected by an intermediate transverse web 24c and defining opposed shallow glazing pockets 56 and 57. Thus it will be seen that there are no removable glass stops in the intermediate horizontals. Suitable screw splines 24d are extruded within the internal tubular face portions 24a and 24b to provide for attachment of the intermediate horizontals to the two verticals. Such attachment may, if desired, be accomplished with a stud connection, wherein stud fasteners projecting from the end of the horizontal 24 would be inserted in suitable holes in the through verticals. However in the illustrated embodiment, shear blocks 58 are provided for attaching the intermediate horizontals to the through verticals. More specifically the shear blocks 58 are fastened into the side surfaces of the face portions 32 and 43 of the desired vertical mullion by suitable screws 59. Moreover the tubular faces 24a and 24b of the horizontals are cut away at the bottom, as indicated at 24c, FIG. 11, so that the horizontal may be positioned over the shear blocks 58 after they have been fastened to the vertical mullions. Screw fasteners 60 secure the intermediate horizontals to the shear blocks 58.

The mullions and intermediate horizontals provide adequate strength transverse to a wall, however because of the comparatively narrow width of the sections it may not be desired to carry the glass loads in the horizontals. Accordingly to prevent transmitting the glass load to the intermediate horizontals, in the illustrated embodiment suitable nylon studs 62 may be provided threaded through the web 24c of the intermediate horizontal 24 and transmitting the upper glass load from the glass panel 35 directly into the lower glass panel 36, as best illustrated in FIG. 2. However, it has been found that the glass load will be transferred to the intermediate horizontals through conventional setting blocks at one-sixth or one-fourth points, so that significant bending loads do not occur in the intermediate horizontals. Accordingly the nylon studs 62 may be omitted if desired.

The header member 27 and sill members 31 and 32 are all identical and perform the same function. More specifically each includes a gutter element 64, FIGS. 2 and 4, which may be fastened directly into the building wall by suitable fasteners, here shown as screws 65. The screws 65 are directed through a somewhat intermediate section having a T-shaped lower groove 64a, and to prevent collapse of the gutter section 64 in this area a suitable fastening block or chair 67 is inserted in the T-shaped groove 64a under the fasteners 65. The gutter sections 64 are provided with portions interlocking with suitable glass stops 68.

In view of the removable glass stops 68 on the header member 27 and sill members 32 and 33, it is not necessary for the intermediate horizontal to have removable stops. Suitable setting blocks 69 are used spaced below the bottom of the lower panel 36. Moreover the T-shaped grooves 64a provide clearance for fastening straps and the like for the mullions and threshold.

Figures 4, 5:
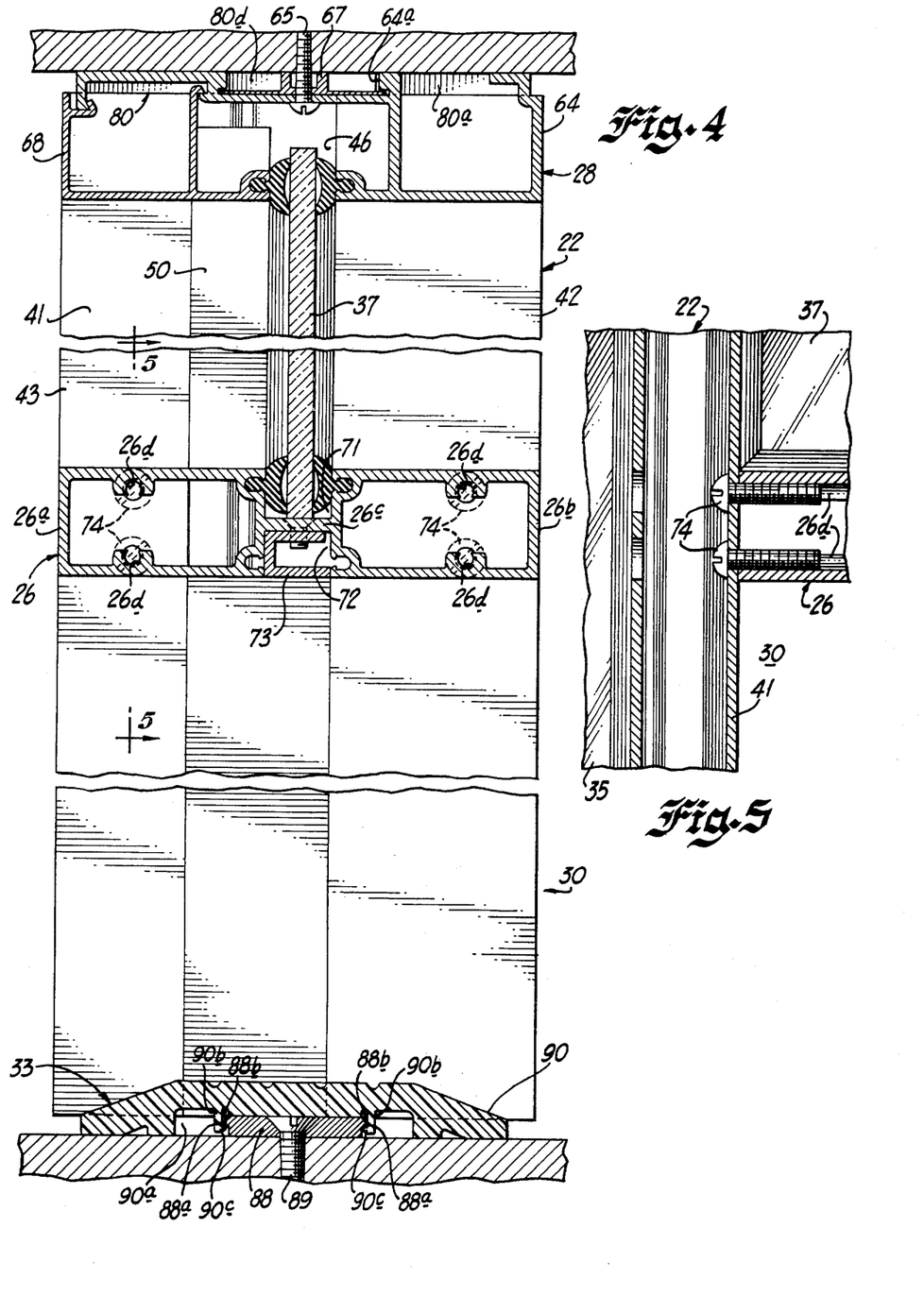
FIG. 4 is an elevational cross sectional view of the glass framing assembly of FIG. 1, taken along line 4—4 of FIG. 3.
FIG. 5 is a cross sectional detailed view of the glass framing assembly of FIG. 1, taken along line 5—5 of FIG. 4.

The transom member 26 is similar to the other intermediate horizontals in that it includes opposed face portions 26a, 26b, FIG. 4, interconnected by transverse web portion 26c, and defining opposed shallow glass pockets 71 and 72. A suitable filler or door step 73, in the illustrated embodiment, covers the lower pockets 72. Prefereably the transom member 26 is fastened directly to the web of the two verticals, and to this end the transom member 26 is provided with a plurality of screw spines 26d to provide for the direct attachment by suitable screws 74.

Figure 9:
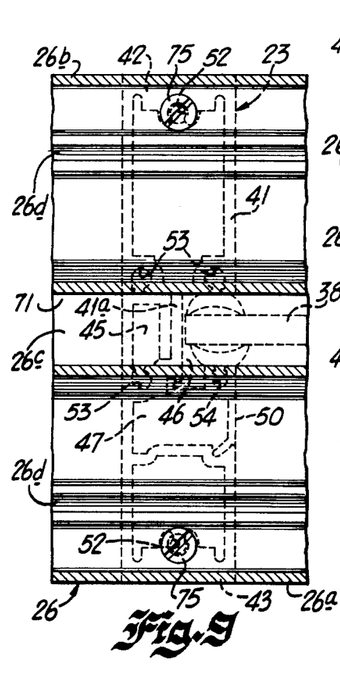
FIG. 9 is a sectional detailed view of the glass framing assembly of FIG. 1, taken along line 9—9 of FIG. 1.
Figure 10:
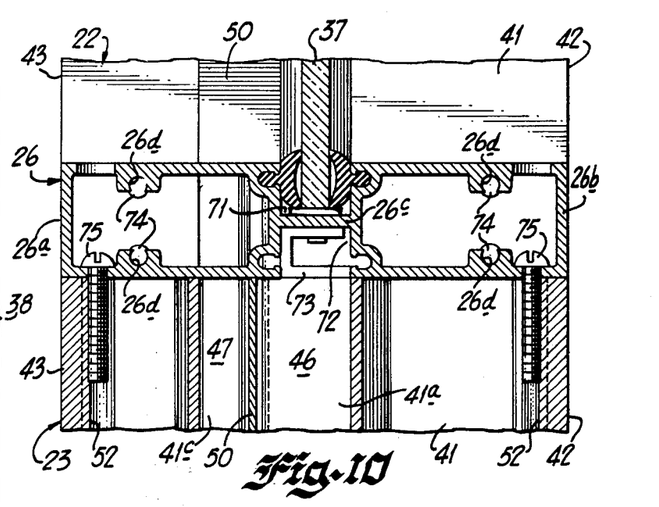
FIG. 10 is a sectional detailed view of the glass framing assembly of FIG. 1, taken along line 10—10 of FIG. 1.

The cripple mullion 23 may be secured directly to the transom member 26 by suitable screws 75, as best illustrated in FIGS. 9 and 10.

Figure 8:
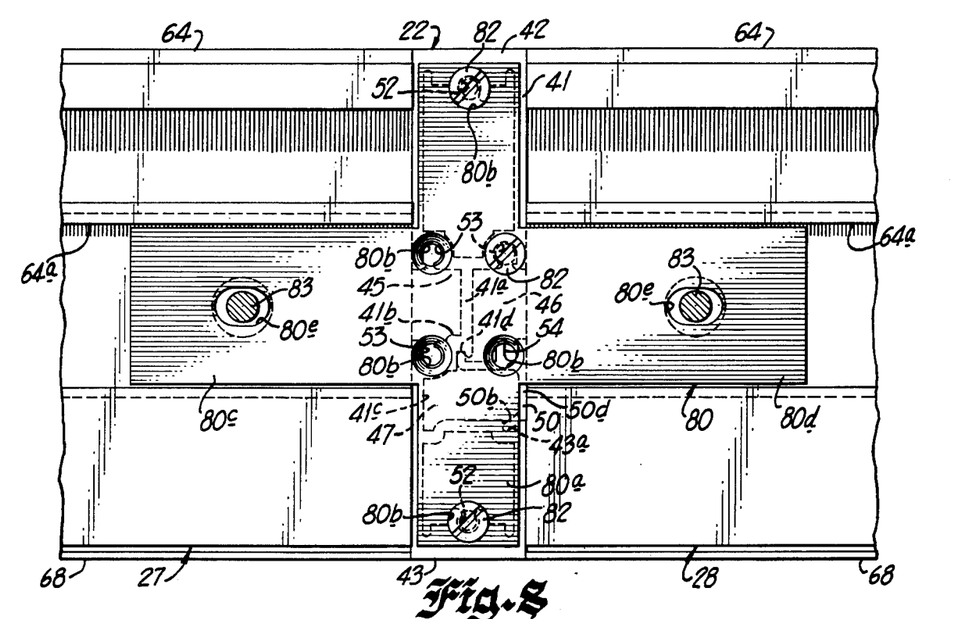
FIG. 8 is a sectional detailed view of the glass framing assembly of FIG. 1, taken along line 8—8 of FIG. 1.

Suitable mullion anchors are provided for the top and bottom of the through mullions. Specifically, and referring first to intermediate vertical mullions such as mullion 22, the mullion anchor 80, FIGS. 8 and 12, is provided of generally cross shape having a body portion 80a formed with a plurality of screw holes 80b to selectively receive suitable screw fasteners 82 extending into aligned screw splines in the mullion. A pair of opposed legs 80c, 80d, are provided with suitable openings, here shown in the form of slots 80c for receiving suitable screw fasteners 82 securing the assembled anchor and mullion to the building wall or floor.

However for attaching the end mullion, such as mullion 21, to the building, one of the legs of the mullion anchor is cut off so that there is provided suitable mullion anchors 85 of generally T-shape having a body portion 85a formed with suitable screw holes 85b for receiving screws threaded into the corresponding screw splines of the vertical mullion A single outstanding leg 85c is provided with an opening such as slot 85e for receiving suitable fasteners into the wall or floor of the building. It would be understood that the legs 85c, 80d of the mullion anchor 80 and the legs 85c of the mullion anchor 85 will fit within the groove 64a of the gutter sections 64, providing for typing of the gutter sections to the anchors.

As best illustrated in FIG. 4, the threshold assembly 33 includes a fastening block or strip 88, extending under the jamb mullions 22 and 23 and secured thereto by screws threaded through the strip 88 into the screw splines of the respective mullions. The threshold strip 88 is secured to the floor of the building in any suitable manner as by screws 89. The threshold strip includes outwardly extending projections 88a being chamfered at their upper edge to define cam surfaces 88b. A threshold member 90 is provided having a central recess 90a and a pair of somewhat resilient fingers 90b having detent portions 90c arranged to cam over the cam surfaces 88b and snapped into locking position over the projections 88a. The threshold member 90 may be formed of any suitable, somewhat resilient material, and in the illustrated embodiment is formed of a plastic material. Advantageously a plastic threshold provides desirable wear properties, and permits for matching color of the threshold to be incorporated into the body of the threshold member 90. Accordingly any coloring of the threshold member 90 will not wear off with usage of the member. Moreover the strip 88 prevents collapse of the threshold member 90.

Figure 13:
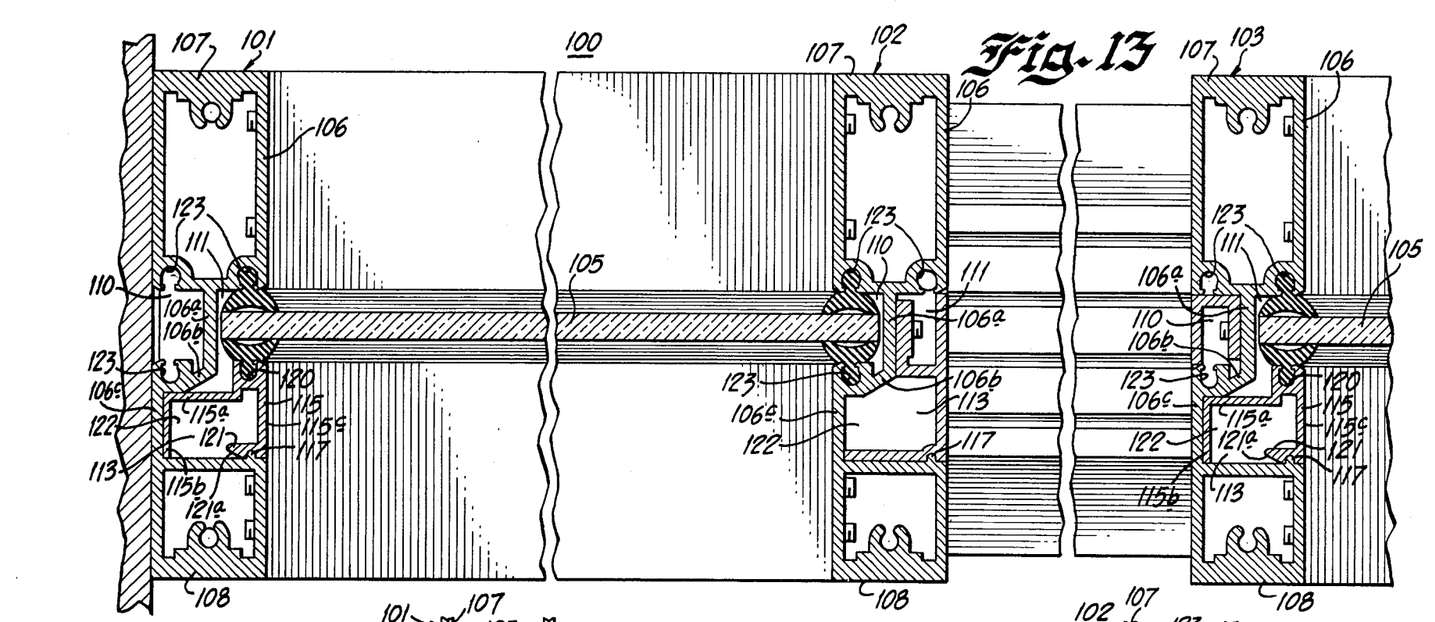
FIG. 13 is a plan sectional view of a glass framing system according to another embodiment of the invention.
Figure 14:
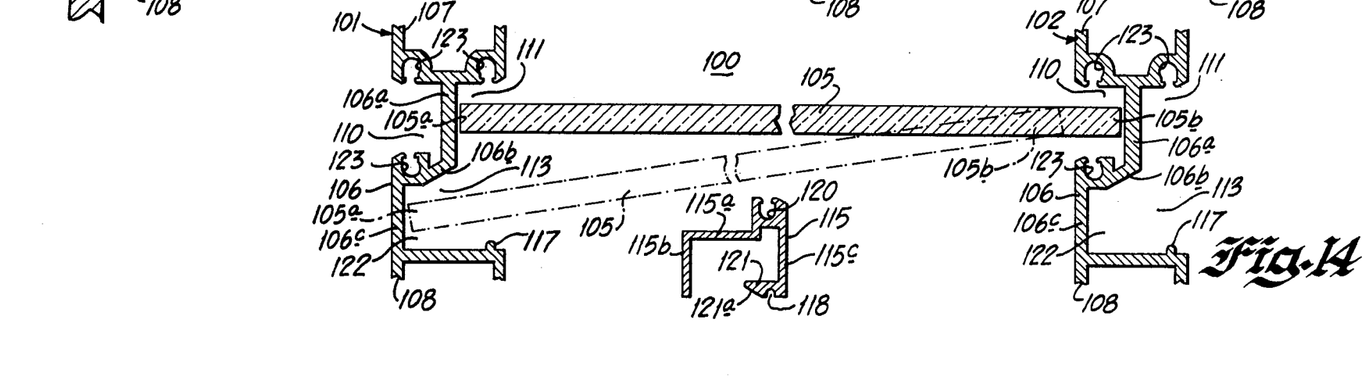
FIG. 14 is a fragmentary plan view of the glass framing assembly of FIG. 13 illustrating the glazing technique.

Referring now to the embodiment of FIGS. 13 and 14, there is illustrated a variation of the present wall system similar to that heretofore described but wherein a snap in mullion filler is provided rather than a roll-in mullion filler.

Specifically, there is illustrated a glass framing assembly generally referred to as 100 in accordance with the present embodiment of the invention. As therein illustrated the glass framing assembly 100 includes spaced vertical mullions 101 and 102 and a cripple mullion 103, similar to the vertical mullions 21 and 22 and the cripple mullion 23 heretofore described, but adapted for receiving snap-in mullion fillers. Suitable interconnecting mullions and frame members are provided to define glazing openings and entrances and, in particular, for supporting a glazing panel 105 of glass or other suitable material.

The basic vertical members or mullions, such as the mullions 101, 102 and 103 are best illustrated in cross-section in FIG. 13. Referring to the vertical mullion 101 as typical, the vertical mullion 101 includes a unitary extruded construction element 106, of aluminum or other suitable extrudable material, having inner and outer face portions 107 and 108 and interconnecting portions. Each of the inner and outer face portions, in the illustrated embodiment, are of generally tubular crosssection of particularly narrow width. In a particular commercial embodiment, the width of the face portions 107 and 108 is one inch. The face portions 107 and 108 are connected by suitable web portions including a longitudinally extending transverse web portion 106a having one edge thereof integrally secured to the face portions 107 intermediate its width and forming the bottom of opposed shallow glazing pockets 110, 111. A longitudinally extending web 106b extends normal to the transverse web 106a therefrom to the side surface of the face portion 108, and a further transversely extending web 106c interconnects the web 106b with the face portion 108. The webs 106b and 106c with the face portion 108 together define a deep glazing pocket or area 113 contiguous with the shallow glazing pocket 111.

To retain glazing in place in the contiguous glazing pockets 111 and 113, there is provided a suitable mullion filler 115. In the illustrated embodiment the mullion filler 115 is of the snap in type, of somewhat U-shape having a bight portion 115a, FIG. 14 and outwardly projecting legs 115b, 115c. A suitable gasket retaining channel 120 is provided along the bight portion 115a adjacent the leg 115c. A longitudinally extending rib 117 is provided within the contiguous pockets 111 and 113 for receiving or interlocking with the longitudinally extending groove 118 of the mullion filler 115. The groove 118 is defined on the outer surface of an inwardly projecting web 121 at the free end of the leg 115c. The web 121 is provided with a camming surface 121a adapted to snap over the rib 117. Moreover the leg 115b of the mullion filler 115 is demensioned to be received within a channel 122 defined between the web 106b and the face 108 of the mullion 101. As is well known, additional gasket retaining channels 123 are provided on the construction element 106.

The manner of glazing for the wall system 100 is similar to that heretofore described and is best illustrated in FIG. 14. As therein illustrated the glass panel 105 has a first edge 105a positioned within the deep glazing pocket 113 of the vertical mullion 101. The other end 105b thereof will then clear the face portions of the adjacent mullion 102, so that the panel 105 may be directed into the shallow glazing channel 110 of the mullion 102. Thereafter the panel 105 may be shifted laterally from the position illustrated in phantom in FIG. 14 to the position illustrated in solid. The mullion filler 115 may then be snapped into position, the cam surface 121a caming over the rib 117 so that the rib 117 snaps into the groove 118 and so that the leg 115b locks into the channel 122. The retaining and glazing gaskets are installed, and the glazing is now complete.

Although various embodiments of the invention have been described, it will be apparent that numerous other modifications and embodiments may be devices by those skilled in the art and it is intended by the appended claims to cover all modifications and embodiments which will fall within the true spirit and scope of the present invention.

What is claimed as new and described to be secured by Letters Patent of the United States is:

1. A method of installing a planar member in a framing assembly comprising the steps of disposing first and second, substantially identical elongated construction elements forming at least a portion of said framing assembly in a substantially parallel, spaced-apart vertical condition defining a space for receiving said planar member therebetween, positioning a first elongated vertical edge of said planar member in a relatively deep portion of a stepped glazing pocket of said first construction element, moving said planar member until a second elongated vertical edge, spaced-apart and parallel to said first edge, of said planar member is positioned in front of the opening of a shallow glazing pocket of said second construction element, positioning said second edge in said shallow glazing pocket, and moving said first edge of said planar member laterally across said first construction element until said first edge is positioned in a relatively shallow portion of said stepped glazing pocket disposed substantially adjacent to said relatively deep portion of said stepped glazing pocket.

2. A method of installing a planar member as defined in claim 1 further comprising the step of covering said relatively deep portion of said stepped glazing pocket to thereby prevent access thereto by securing a filler member to said first construction element.

3. A method of installing a glass planar member as defined in claim 2 further comprising the steps of securely positioning at least a pair of gasket members between said planar member and said second construction element, securely positioning a gasket member between said planar member and said first construction element, and securely positioning a gasket member between said planar member and said filler member to thereby space said planar member from said first and second construction elements and from said filler member.

* * * * *